Dec. 6, 1966   D. E. THOMAS ET AL   3,289,943
THERMAL BARRIER FOR THRUST VEHICLE NOZZLE
Filed Aug. 17, 1962   2 Sheets-Sheet 1
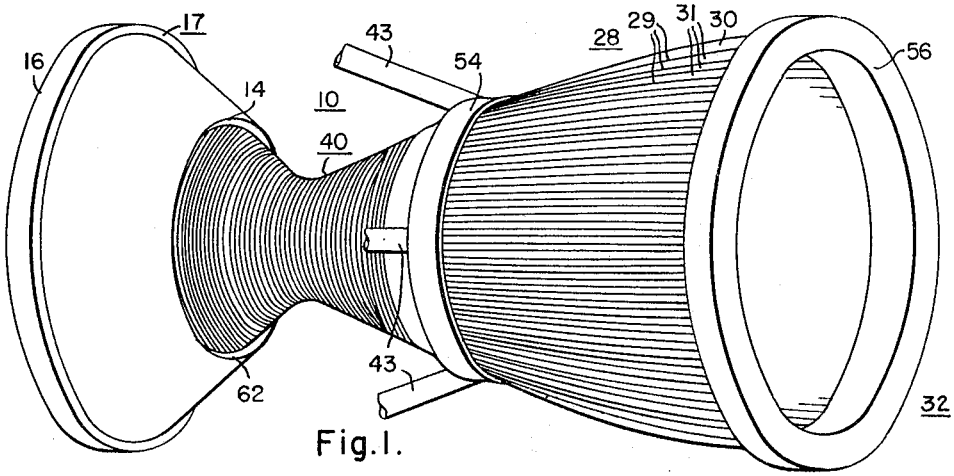
Fig. 1.
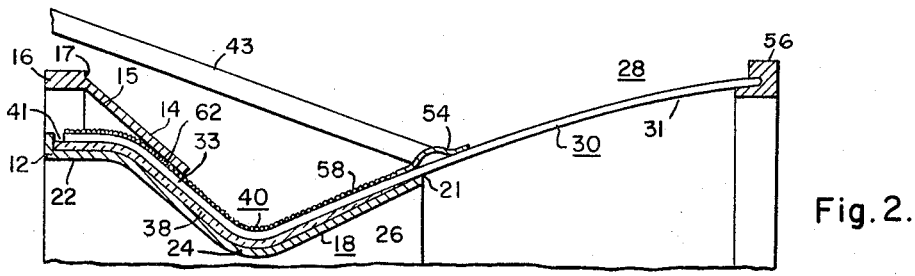
Fig. 2.
Fig. 3.
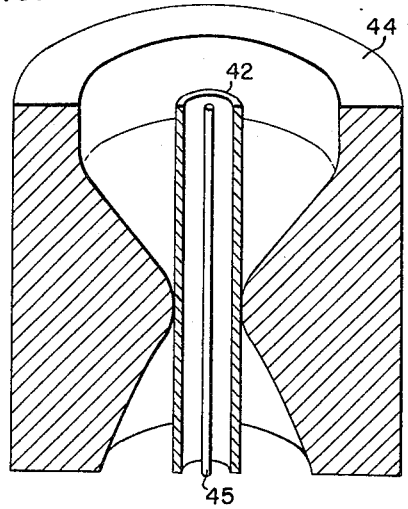
Fig. 4.
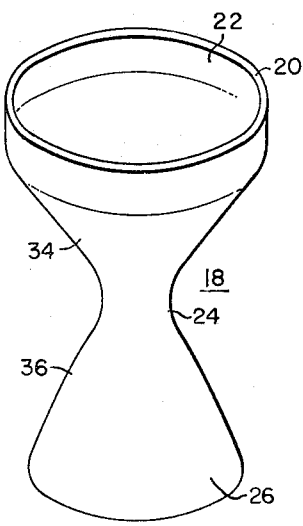
WITNESSES
Edwin E. Bassler
Edward F. Possessky
INVENTORS
Donald E. Thomas &
Raymond W. Buckman, Jr.
BY D. J. Smith
ATTORNEY

United States Patent Office 3,289,943
Patented Dec. 6, 1966

3,289,943
THERMAL BARRIER FOR THRUST VEHICLE NOZZLE
Donald E. Thomas, Mount Lebanon Township, Allegheny County, and Raymond W. Buckman, Jr., Pittsburgh, Pa., assignors to Westinghouse Electric Corporation, East Pittsburgh, Pa., a corporation of Pennsylvania
Filed Aug. 17, 1962, Ser. No. 217,698
4 Claims. (Cl. 239—127.1)

The present invention relates to nozzles employed in gas expulsion systems and more particularly to such nozzles which form a part of a thrust vehicle or rocket.

In providing forward thrust for a vehicle, it is common to expel gaseous matter rearwardly from the vehicle to its exterior and thereby obtain the benefit of reactionary forward force. One common form of thrust vehicle is a rocket which is so designed aerodynamically as to be suitable for either atmospheric or extra-terrestial flight, and the gaseous matter expelled from such a vehicle can be derived from one or more of several sources. For example, in chemical rockets, gaseous matter ordinarily originates as a high temperature product of some form of combustion and is expelled through an expansion process, whereas, in nuclear rockets, gaseous matter commonly is obtained from a storage container in the rocket and is heated to a high temperature by a nuclear core for subsequent expansion and expulsion.

An expanding gas in the process of expulsion from a thrust vehicle or rocket preferably is directed in its exiting movement in a single generally rearward direction so as to produce maximum reactionary force in a single generally forward direction. Accordingly, among other related or independent functions, a rocket nozzle provides this generally advantageous directing function. In order to do so, however, it is necessary that a rocket nozzle be so arranged as to have the capacity to withstand thermal effects resulting from the expanding gaseous matter which is being directed through it for thrust purposes. Further, a rocket nozzle must have the capacity to withstand mechanical forces resulting, for example, from expected patterns of rocket motion.

In many cases, the structural nature of a rocket nozzle presents only ordinary design challenges with respect to avoidance of reliability problems arising from thermal and other physical factors. In other cases however, there is a lack of apparent means of obtaining such avoidance. For example, in a nuclear rocket, gaseous matter channeled through the rocket nozzle is characterized with an extremely high equilibrium temperature in order to obtain maximum forward rocket thrust in an economic manner. This temperature can exist in the range of 4500° R. to 5000° R. If the nozzle is simply formed from a metal which might hopefully remain unaffected by the encountered high operating temperatures because of its relatively higher temperature point of melting, the fact is that heat transfer through the wall or walls of the nozzle to the exterior (enhanced by exterior positive cooling if this is desirable or necessary) can produce across the wall extreme thermal gradients and resulting thermal stresses which in turn can lead to failure, for example through high-strain, low-cycle fatigue.

Further, the provision of ceramic heat resistant material on the inner surface of the metallic nozzle wall to obtain protection for the latter against failure, as is often the case in chemical rockets, is of little value in nozzles where extremely high operating temperatures are encountered, for example in nuclear or high temperature chemical rockets. Thus, in the environment of such temperatures, ceramic or other heat resistant lining material would be particularly susceptible to fracture and resulting breakage and escape from the metallic nozzle wall so that any original protection would have been lost. In accordance with the present invention, a nozzle can be so arranged structurally as to function efficiently and reliably in the attainment of its intended purpose without interference from either the problems outlined here or other factors which will become apparent hereinafter.

Therefore, it is an object of the invention to provide a novel and efficient nozzle for a thrust vehicle.

An additional object of the invention is to provide a novel and efficient nozzle for a thrust vehicle wherein thermally insulative material is held captive between an inner heat-conductive wall and an outer heat removal arrangement or wall so as to prevent the inner wall from failing as a result of thermal stresses produced by heat transfer through the inner wall from gaseous matter directed through the nozzle.

It is a further object of the invention to provide a novel and efficient nozzle having captive thermally insulative material disposed between an inner heat conductive wall and an outer heat removal arrangement, wherein the inner surface of the inner wall is substantially covered with a thin layer of material for protection against chemical degradation.

An additional object of the invention is to provide a novel and efficient nozzle having captive thermally insulative material disposed between an inner heat conductive wall and an outer heat removal arrangement, wherein the inner wall is formed from tantalum or an alloy thereof and wherein the inner surface of the inner wall is covered with a thin layer of tungsten or molybdenum to protect the tantalum from hydrogen degradation.

A further object of the invention is to provide a novel and efficient nozzle having captive thermally insulative material disposed between an inner heat conductive wall and an outer heat removal arrangement wherein the insulative material covers only a throat portion and immediately adjacent converging portions of the nozzle.

Another object of the invention is to provide a novel and efficient nozzle having captive thermally insulative material disposed between an inner heat conductive wall and an outer heat removal arrangement, wherein the outer captivating wall comprises a plurality of turns of ribbon or wire adjacently wound about the insulative material and the inner wall.

It is another object of the invention to provide a novel and efficient method of producing a nozzle for a thrust vehicle.

It is an additional object of the invention to provide a novel and efficient method of producing a nozzle for a thrust vehicle, wherein there are included the steps of forming an inner metallic nozzle wall, covering at least a portion of the outside surface of the inner wall with thermally insulative material and of holding the insulative material captive against the inner wall and inwardly of an outer heat removal arrangement or wall.

These and other objects of the invention will become more apparent upon consideration of the following detailed description along with the attached drawings, in which:

FIGURE 1 is a perspective view of an elongated thrust vehicle nozzle constructed in accordance with the principles of the invention;

FIG. 2 is a view of a longitudinal section of a portion of the nozzle of FIG. 1;

FIGS. 3-7 illustrate various steps which can be taken in producing the nozzle of FIG. 1.

Figure 5:
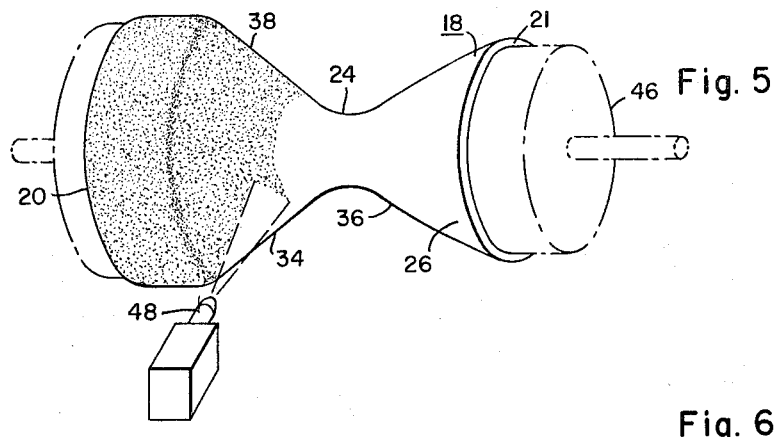

In accordance with the broad principles of the invention, a nozzle for a thrust vehicle comprises an elongated inner wall circumscribing a path for gas expulsion and formed of a suitable good heat-conductive material for strength and temperature capacity and outer cooling wall means with thermally insulative material held captive or contained between at least portions of the inner wall and the outer wall means. The outer wall means can include ribbon or wire wound helically about the inner wall. As a matter of method, a nozzle can be formed by steps comprising forming an inner heat conductive nozzle wall so as to circumscribe a path for gas expulsion, covering at least a portion of the outer surface of the inner wall with thermally insulative material and captivating the insulative material against the inner wall and inwardly of outer cooling wall means.

More specifically, there is shown in FIG. 1 an elongated nozzle 10 for use with a thrust vehicle or rocket (not shown). In this connection, a turned over inner end portion 12 of the nozzle 10 (FIG. 2) can be mechanically supported, by any suitable means, relative to a complementary nozzle supporting member (not shown) of such a vehicle. In the case of an elongated nuclear rocket, a shell 14, having a ring 16 with a flange 17 for connection to a pressure vessel of the nuclear rocket, can also be employed to enclose the inner end of the nozzle 10 and also to give added nozzle support. Generally, the nozzle 10 is contoured longitudinally in such a manner as to take advantage of gas flow principles in maximizing thrust efficiency.

An elongated liner 18 (FIGS. 4 and 5) in this instance forms a portion of the length of the nozzle 10 and comprises a continuous wall 20 which forms a channel 22 (FIG. 4) for gas flow. The wall 20 is continuous to prevent the exposure of gas flowing through channel 22 from passing to the exterior of wall 20 and similarly prevents thermal barrier material, to be described, from entering channel 22 through wall 20. In other cases, the nozzle 10 will have a given desirable length, and the liner 18 can form a portion of that length or it can form the entire length. The liner 18 converges from the nozzle inner or inlet end portion 12 to a continuous throat portion 24 and flares outwardly from the throat portion 24 to a longitudinally outer portion 26. In extremely high temperature applications, the liner 18 can be made of a refractory metal, such as tungsten, tantalum, molybdenum or an alloy of any of these metals, so as to provide both physical strength and temperature handling capacity. Additional comments on the liner material will be set forth subsequently.

Wall means 28, in this case comprising respective inlet portions 29 and respective intermediate portions 31 of coolant tubes 30, can extend substantially continuously from the liner outer end portion 26 and further longitudinally outwardly to a nozzle outer or discharge end portion 32 (FIG. 1). The coolant tubes 30 are held together to form the extension wall means 28 in a manner described more fully subsequently. The nozzle extension comprising the extension wall means 28 or the coolant tube portions 29 and 31 can be provided, and if so is flared outwardly for optimum thrust efficiency as determined by force and motion theory of expanding gaseous matter, if the liner 18 itself is not sufficient for this purpose. Further, if the extension wall means 28 are employed, positive cooling (through circulation of cooling fluid in the tubes 30 in this case) can be provided for it or any portion of it to the extent that this is deemed to be operationally necessary. Additional structural information in relation to the coolant tubes 30 will be presented subsequently in connection with manufacturing steps which can be employed in forming the nozzle 10.

Extremely high gas equilibrium temperatures are encountered by the material of the nozzle 10 primarily along regions of maximum gas flow, that is along the inner surface of nozzle liner portions 34 and 36 as well as the inner surface of the throat portion 24 into which the liner portions 34 and 36 converge. In order to prevent fracture of the liner 18, even though it is formed of a material having high temperature capabilities, a layer 38 of thermally insulative material (FIG. 6 and FIG. 2) is located against or covered over the outer surface of the liner 18.

The thermally insulative layer 38 preferably is provided along the entire length of the liner 18, that is over substantially its entire outer surface including that of the throat and converging portions 24, 34 and 36, respectively. In this manner, the steepest portions of the thermal gradient between the high temperature interior and the cooler exterior of the liner 18 appear substantially across the thermally insulative layer 38 and not across the liner wall 20. Fracture of the liner wall 20 is accordingly efficiently inhibited since thermal stresses on the wall 20 are minimized. Further, the magnitude of heat transfer flux to the exterior is reduced and therefore external coolant requirements can be diminished.

The fact is, however, that the thermally insulative layer 38, particularly if it is formed solidly, is itself subject to fracture since the thermal gradient removed from the liner wall 20 appears across the insulative layer 38. Therefore, wall means 40 (FIG. 1) including a cooling arrangement or respective inmost or outlet portions 33 of the coolant tubes 30 are, in this example, located against the outer surface of the insulative layer 38 so as to accept heat transfer therefrom and also to hold the layer 38 captive against the nozzle liner 18 as well as to provide nozzle strength against operational exhaust gas pressure. Again, positive cooling (by coolant flow) is provided by the captivating wall means 40 to the extent that this is deemed to be necessary, and preferably such cooling is provided over substantially the entire outer surface of the insulative layer 18. Any thermally induced or otherwise induced fracture of the insulative layer 18 is of neglectable concern since even fragmented portions (not shown) of the layer 18 are held in place against escape. It follows that the insulative layer 18 can be applied by any suitable technique, such as by flame or plasma deposition, or in any suitable form, such as that of powder, foam, fibers or wrapping.

The description so far has been directed principally toward the general structural nature of the nozzle 10 and consideration will now be given to more specific nozzle structure as well as fabrication methods. There is shown in FIG. 3 an exemplary method by which the liner 18 can be formed. Thus, a tube 42 of suitable material and dimensions is located in a die 44 and subjected to explosive forces of a rod 45 of any well known explodable material. Tantalum, or an alloy thereof, is suitable as a liner material for this forming step and additionally has suitable properties for extremely high exhaust temperature applications. Although molybdenum, or an alloy thereof, generally has melting point limitations, it can be used in relatively lower exhaust gas temperature applications.

When the liner 18 is formed as shown in FIG. 4, a coating can be applied to the inner surface of the liner wall 20 if this step is necessary for protection against chemical degradation of the liner material. For example, if the liner material comprises tnatalum, hydrogen degradation can be encountered (especially in nuclear rockets which employ hydrogen as a thrust gas to obtain maximum specific impulse). To counter this effect, molybdenum or tungsten can be applied to the inner surface of the liner wall 20 by any suitable means, for example by halide decomposition of tungsten or molybdenum fluoride gas (FIG. 4) channeled through the liner 18 in a suitable environment.

At this stage of the fabrication, a removable mandrel 46, comprising two or more parts which are individually inserted into the liner 18 and suitably interengaged, can be employed to facilitate application or placement of the thermally insulative layer 38 on the outer surface of the liner wall 20. For example, the insulative layer 38 can be placed (FIG. 5) by covering or by spraying (for example, by a plasma technique or with a gun 48) a fused oxide, such as alumina, hafnia, thoria, zirconia, or any other suitable material over a portion of the outer liner surface or, as here, over substantially the entire outer liner surface. Particularly in the case of sprayed application, the employed material preferably is cooperative with the material of the liner wall 20 in the sense that it should have high temperature capabilities and other properties which make it compatible with the liner wall material for bonding or adherence purposes. The adherence compatibility of any of the specifically denoted insulative materials is reasonably acceptable up to a temperature of at least 3700° R.

Figure 6:
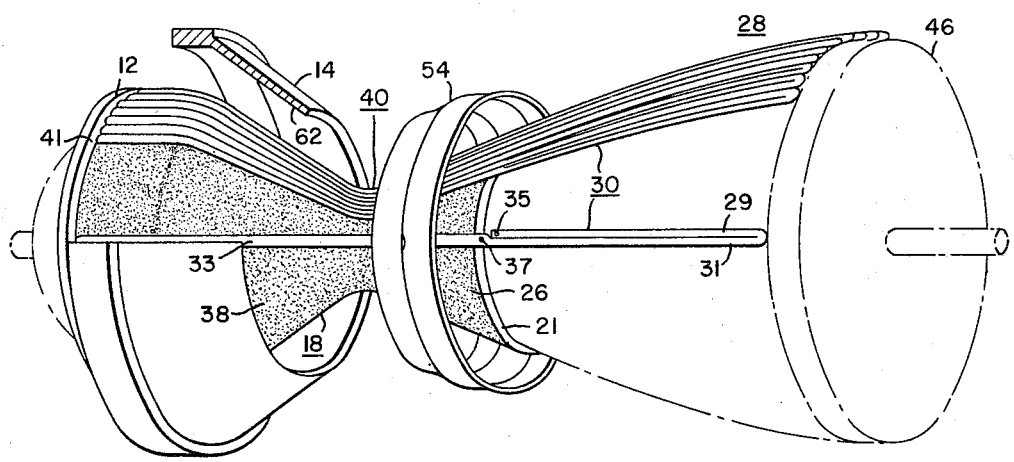

When the steps so far described have been completed, the captivating wall means 40, as well as the extension wall means 28, if it is to be provided, can then be assembled relative to the nozzle liner 18. If the shell 14 is used for reasons previously denoted, it is first fitted over the outer end 21 of the liner 18 as shown in FIG. 6. The coolant tubes 30 can next be located longitudinally along the liner 18 and through the shell 14 and are formed or preformed by suitable means preferably to conform substantially to the longitudinal contour of the liner 18. Further, the coolant tubes 30 can be somewhat flattened to provide lateral surface coverage where it is found this is necessary because of the flared nozzle shape.

If it is not desired to extend the nozzle 10 beyond the outer end portion 26 of the liner 18, the coolant tubes 30 can include only the portions 33 and thereby be terminated with coolant openings at that point, and an inlet coolant ring 54, communicating with all of the tubes 30 as a manifold, can be secured over the liner and outer end portion 26 by any suitable means such as by brazing. A plurality of inlet pipes 43 suitably securable to the ring 54 provide for incoming flow from the noted pressure vessel. If the extension wall means 28 are to be provided as a nozzle extension, the coolant ring 54 can be located in the position described, and it would then provide an inlet flow path through the inlet coolant tube portions 29 having suitable inlet orifices 35 and preferably also a parallel inlet flow path through the outlet coolant tube portions 33 having suitable inlet orifices 37. Further, one or more strengthening rings 56 can be employed along the length of the wall means 28, and in this case one is shown adjacent the nozzle discharge end portion 32 for purposes of stability. It is noted that some coolant fluid flows outwardly through the coolant tube inlet portions 29 and then inwardly through the coolant tube portions 31 to the outlet portions 33 where it is mixed with the remaining incoming fluid for further inward flow through the tube portions 29. The coolant fluid exits through suitable outlet orifices 41 into a collection chamber (not shown) formed when the nozzle 10 and its shell 14 is secured to the noted pressure vessel of the rocket.

Figure 7:
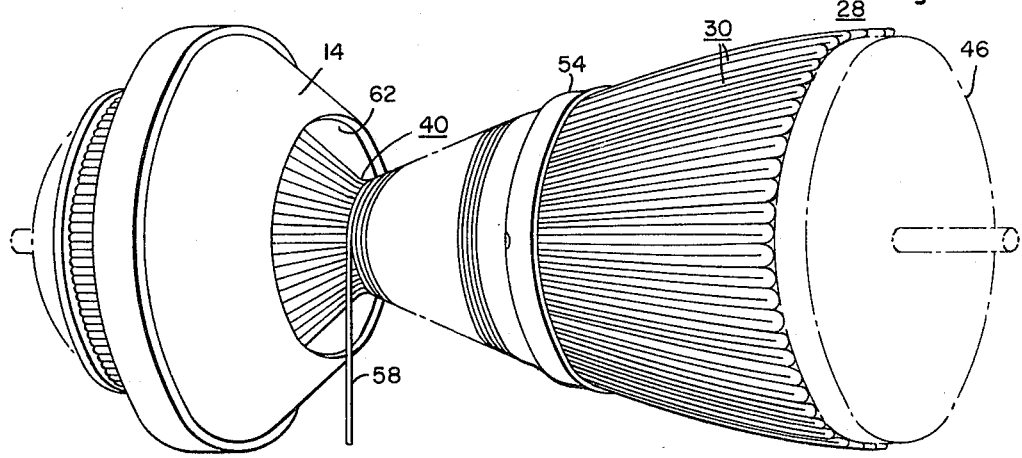

When the rings 54 and 56 are located and secured as described, a strip 58 of ribbon or wire (FIG. 7) is in this case located against the coolant tubes 30 adjacent the coolant ring 54 and wound helically (preferably with successive turns being adjacent for subsequent interbonding) about the tubes 30 inwardly along the liner portions 36, 24 and 34 to the nozzle inlet end 12. In the alternative, the wire 58 can be wound directly against the insulating layer 38 with the coolant tubes 30 being placed adjacently outwardly thereof, but in any event the wire 58 provides substantial nozzle strength against internal pressure. In the limiting placement of the shell 14, a substantial area 62 of the shell 14 is abutted against the wire 58 (as observed in FIG. 2) for securance thereto. The material of the wall means 28 or 40, including the tubes 30, the coolant rings 54 and 56, the shell 14 and the wire 58, is preferably selected for such compatability among these elements and the insulative layer 38 and the liner 18 as will prevent chemical interaction at the anticipated operating temperatures, and also for metallurgical compatability wherever bonding is desired or necessary. It is preferred that bonding be provided laterally among the coolant tubes 30 to provide a solid wall surface and further that bonding be provided between the coolant tubes 30 and liner end portions 12 and 21 (FIG. 2), the rings 54 and 56, and the wire 58, respectively, and between the wire 58 and the shell 14. Accordingly, metallurgical compatibility in these instances is preferred. Such materials as nickel base alloys, stainless steels, titanium or even aluminum base alloys can serve as a material inventory for the fabricator.

Securance of all of the structural elements in assembled relation can be accomplished by any suitable means, for example by brazing. Upon securance, as already noted, the wire 58 significantly strengthens the nozzle 10 against internal gas pressure by holding the coolant tubes 30 in place, and the latter along with the wire 58 form a captive barrier for retention of the insulative layer 38. Further, the shell 14 is effectively secured to the wire 58 for subsequent attachment of its flange 17 to the noted pressure vessel. In addition, the coolant rings 54 and 56 are secured in place relative to the liner 18 and the portions 31 and 33 of the coolant tubes 30 located between the rings 54 and 56 are bonded together so as to form the extension wall means 28. Of course, the wall means 28 or 40 can be provided in other forms, or as previously noted, the extension wall means 28 can be eliminated altogether in certain applications. In any event, the captivating wall means 40 preferably provide for positive cooling of the nozzle liner 18 and in addition provide for reliably captivating the insulative layer 38 between the captivating wall means 40 and the nozzle liner 18.

The foregoing description has been presented only to illustrate the principles of the invention. Accordingly, it is desired that the invention be not limited by the embodiment or embodiments described, but rather, that it be accorded an interpretation consistent with the spirit and scope of its broad principles.

What is claimed is:

1. A nozzle for a thrust vehicle, said nozzle comprising an elongated hollow member suitably contoured in longitudinal section and in cross section to channel an expanding high temperature gas therethrough for efficient thrust of said vehicle, a layer of thermally insulative material located in contiguous relation with at least a peripheral portion of the outer surface of said member, said peripheral surface portion of said member being so located and sized longitudinally of said member as to be correlated thermally with at least the relatively highest temperature portion of the interior surface of said member, said liner portion having a continuous surface thereon to prevent exposure of said layer to the interior of said nozzle, and cooling wall means secured relative to said member outer surface and over said insulative layer, said wall means being positioned to captivate completely said insulative layer against dislocation and, in heat transfer relation therewith for cooling said member during operation said wall means including a plurality of coolant tubes secured to an inner end of said member and extending longitudinally of said member and adjacently of each other, said wall means also including a length of wire wound helically against said coolant tubes about said member with the helical axis extending longitudinally of said member, said wire and said tubes being so located and so bonded together as to form conjunctively a substantially solid barrier against dislocation of said insulative layer and in addition to provide substantial nozzle strength against internal gas pressure.

2. A nozzle for a thrust vehicle, said nozzle comprising an elongated hollow member suitably contoured in longitudinal section and in cross section to channel an expanding high temperature gas therethrough for efficient thrust of said vehicle, a longitudinally extending liner portion of said member being disposed adjacent at least the highest operating temperature region of the gas path through said member and accordingly being formed of a refractory metal for temperature capacity, a layer of thermally insulative material located in contiguous relation with a laterally peripheral portion of the outer surface of said liner portion, said liner portion having a continuous surface thereon to prevent exposure of said layer to the interior of said nozzle, and cooling wall means secured relative to the outer surface of said liner portion and over said insulative layer, said wall means being positioned to captivate completely said insulative layer and in heat transfer relation therewith for cooling said member during operation said wall means including a plurality of coolant tubes secured to an inner end of said member and extending longitudinally of said member and adjacently of each other, said wall means also including a length of wire wound helically against said coolant tubes about said liner portion with the helical axis extending longitudinally of said member, said wire and said tubes being so located and so bonded as to form a substantially solid barrier against dislocation of said insulative layer and in addition to provide substantial nozzle strength against internal gas pressure, said coolant tubes having portions extending longitudinally beyond an outer end of said liner portion, and means for securing said tube portions together to form additional gas channeling wall means extending outwardly of said liner portion.

3. A nozzle for a thrust vehicle, said nozzle comprising an elongated hollow member suitably contoured in longitudinal section and in cross section to channel an expanding high temperature gas therethrough for efficient thrust of said vehicle, a longitudinally extending liner portion of said member being disposed adjacent at least the highest operating temperature region of the gas path through said member and accordingly being formed of a refractory metal for temperature capacity, said liner portion including opposite end sections converging into a throat section, a layer of thermally insulative material bonded to substantially the entire outer surface of said liner portion, said liner portion having a continuous surface thereon to prevent exposure of said layer to the interior of said nozzle, and wall means secured relative to the outer surface of said liner portion and over said insulative layer, said wall means being positioned to captivate completely said insulative layer against dislocation and in heat transfer relation therewith and means for cooling said wall means.

4. A nozzle for a thrust vehicle, said nozzle comprising an elongated hollow member suitably contoured in longitudinal section and in cross section to channel an expanding high temperature gas therethrough for efficient thrust of said vehicle, a layer of thermally insulative material located in contiguous relation with at least a peripheral portion of the outer surface of said member, said peripheral surface portion of said member being so located and sized longitudinally of said member as to be correlated thermally with at least the relatively highest temperature portion of the interior surface of said member, said surface portion having a continuous surface thereon to prevent exposure of said layer to the interior of said nozzle, and cooling wall means secured relative to said member outer surface and over said insulative layer, said wall means being positioned to captivate completely said insulative layer and in heat transfer relation therewith for cooling said member during operation said wall means including a plurality of coolant tubes secured to an inner end of said member and extending longitudinally of said member and adjacently of each other, means for laterally securing said coolant tubes together along their length so as to form a barrier against dislocation of said insulative layer, and means for holding said coolant tubes inwardly against said member so as to provide substantial nozzle strength against internal gas pressure.

References Cited by the Examiner
UNITED STATES PATENTS

| | | | |
|---|---|---|---|
| 2,217,193 | 10/1940 | Aronson | 29—157 |
| 2,334,257 | 11/1943 | Egger et al. | 29—157 |
| 2,476,185 | 7/1949 | Goddard | 60—35.6 |
| 2,555,080 | 5/1951 | Goddard | 60—35.6 |
| 2,811,467 | 10/1957 | Hull et al. | |
| 2,849,860 | 9/1958 | Lowe | 60—35.6 |
| 2,880,577 | 4/1959 | Halford et al. | 60—39.66 X |
| 2,933,888 | 4/1960 | Africano et al. | 60—35.6 |
| 2,958,183 | 11/1960 | Singelmann | 60—35.6 |
| 2,972,227 | 2/1961 | Allen | 60—35.6 |
| 2,995,011 | 8/1961 | Kimmel | 60—35.6 |
| 3,004,386 | 10/1961 | Ledwith | 60—35.6 |
| 3,029,602 | 4/1962 | Allen | 60—39.66 X |
| 3,048,972 | 8/1962 | Barlow | 60—35.6 |
| 3,049,877 | 8/1962 | Sherman | 60—35.6 |

MARK NEWMAN, *Primary Examiner.*

SAMUEL LEVINE, *Examiner.*

C. R. CROYLE, *Assistant Examiner.*